Figure 1:
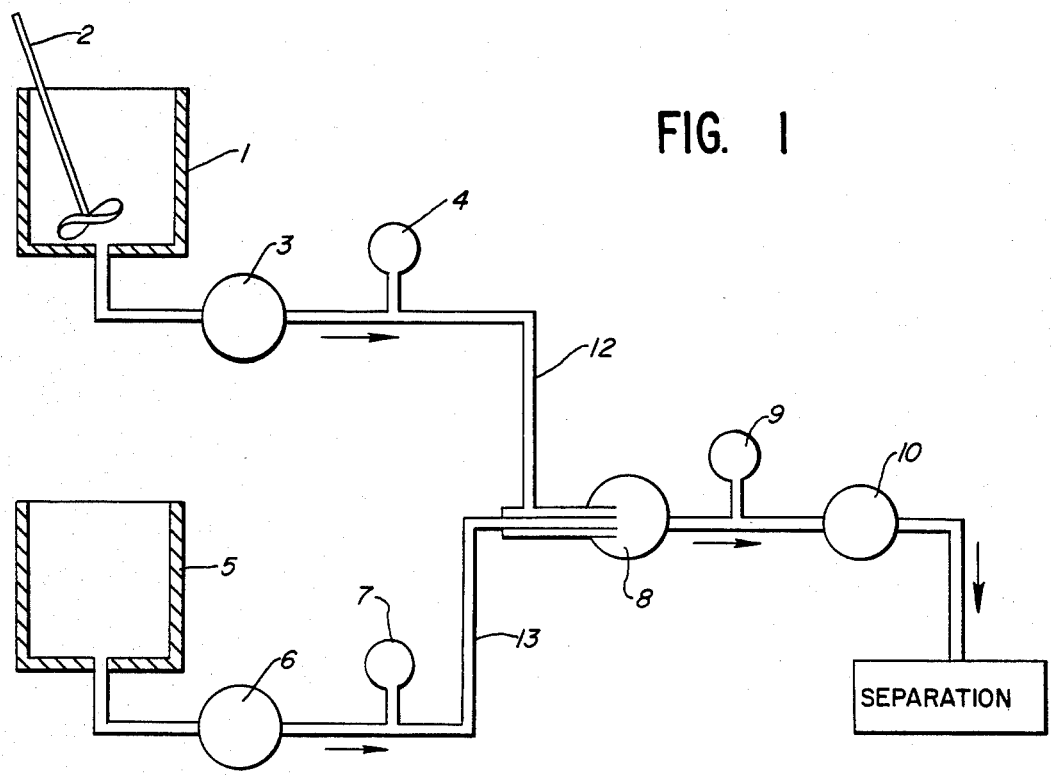

United States Patent [19]

Harvey

[11] Patent Number: 4,517,022
[45] Date of Patent: May 14, 1985

[54] STARCH PRODUCTION FROM CORN

[75] Inventor: Richard D. Harvey, Muscatine, Iowa

[73] Assignee: Grain Processing Corporation, Muscatine, Iowa

[21] Appl. No.: 530,747

[22] Filed: Oct. 17, 1983

Related U.S. Application Data

[63] Continuation of Ser. No. 338,363, Jan. 11, 1982, abandoned.

[51] Int. Cl.³ .................................................. C13L 1/00
[52] U.S. Cl. .......................................... 127/68; 127/70
[58] Field of Search ......................... 127/67, 68, 69, 70

[56] References Cited

U.S. PATENT DOCUMENTS

| | | | |
|---|---|---|---|
| 2,556,322 | 6/1951 | Eckers | 127/69 |
| 3,597,274 | 8/1971 | Gillenwater et al. | 127/68 |
| 3,857,987 | 12/1974 | Rogols et al. | 127/68 |
| 4,181,748 | 1/1980 | Chwalek et al. | 127/68 |
| 4,207,118 | 6/1980 | Bonnyay et al. | 127/68 |
| 4,279,658 | 7/1981 | Harvey et al. | 127/71 |
| 4,416,701 | 11/1983 | Huster | 127/68 |

OTHER PUBLICATIONS

"Comparison of Wet-Milling Properties of Opaque High-Lysine Corn and Normal Corn", S. A. Watson & K. R. Yahl, Cereal Chem. 44, 488 (1967).
"Integrated Starch Wet Milling Process", Th. H. Bier, J. C. Elsken, and R. W. Honeychurch, Starke 26, 25 (1974).
"Fractionation and Characterization of Dent Corn and Amylomaize Starch Granules", J. F. Cluskey, C. A. Knutson and G. E. Inglett, Starke 32, 105 (1980).

Primary Examiner—Richard V. Fisher
Assistant Examiner—W. Gary Jones
Attorney, Agent, or Firm—Neuman, Williams, Anderson & Olson

[57] ABSTRACT

Dehulled and degermed dry-milled corn products are refined by mixing for a period of not more than 4 hours at ambient temperature dehulled and degermed corn containing starch and protein with water to form an aqueous slurry, treating the slurry with alkali, and subjecting the alkali containing slurry to high intensity mixing. Sodium sulfite may be present in the alkali containing slurry. A high-quality starch then is recovered.

3 Claims, 2 Drawing Figures

STARCH PRODUCTION FROM CORN

This is a continuation of application Ser. No. 338,363 filed Jan. 11, 1982, now abandoned.

This invention relates to the production of starch from corn.

Starch has been produced from corn for many years by two general procedures, namely, dry milling and wet milling. Both dry and wet milling procedures accomplish separation of the germ from which corn oil is obtained and removal of the hull which constitutes the majority of the high fiber portion. Dry milling refining processes provide less highly refined starches than starch produced by the wet milling process. However, the dry-milled products find use in many applications, such as in cereals, snack foods, pancake mixes, cookies, biscuits and in the brewing industry, and as a binding agent in core sand for the manufacture of castings. Wet milling refining processes are more costly than dry milling refining and require more time, space, energy, and involve considerably more waste treatment. In wet milling refining, corn is steeped in a dilute aqueous solution of sulphur dioxide at a temperature of about 120° F. or higher for extended periods of anywhere from 24 to 60 hours or more. The steep water is collected and concentrated for the recovery therefrom of soluble components while the softened corn is then processed by subjecting it to a series of grinding and separating operations to separate the corn kernel components, namely the germ, hull and endosperm, which is composed of individual starch granules imbedded in a proteinaceous matrix (gluten). For highly refined starch, additional separating procedures are necessary to separate the starch from protein (gluten). The wet milling refining procedures are not conducive to substantial process variations or intermittent operation. However, many end uses, such as paper coating and sizing, textile sizing, corrugated board adhesive and starch hydrolyzates, require highly refined starch of such purity that the corn must be processed by wet milling rather than dry milling.

It is a major object of this invention to provide a process for producing high purity starch from corn which eliminates the long steeping times normally required for wet milling production of starch.

It is another object of this invention to provide a process for producing starch from corn which is comparable in quality and purity to starch produced by conventional wet milling procedures but which, compared to such conventional wet milling procedures, reduces energy consumption, reduces water consumption, reduces space requirements and costs.

In accordance with this invention, corn flour is treated with an alkali, and optionally sodium sulfite, and subjected to thorough mechanical mixing to hydrate and release the protein. The protein is separated from the starch which is characterized as being clean, white, low in protein and retaining birefringent properties.

The starting material from which starch is produced in the process of this invention is waxy or nonwaxy corn flour, corn cones, brewers' grits, corn meal, brewers' flakes and the like. These starting materials are obtained by dehulling and degerming corn or by conventional corn dry milling procedures. As used herein, the term corn flour is used in a generic sense to include dehulled and degermed corn materials. It is generally preferable that the particle size of the starting material be in the range of about 0.149 to 2.0 millimeters.

According to one presently preferred embodiment, an aqueous slurry of corn flour containing from about 10 to 40% by weight of solids is prepared, to which is added sodium sulfite in an amount of up to about 0.8%, more preferably 0.2 to 0.6%, by weight of the corn flour. This mixture is stirred for a suitable period of from 0.25 to 4 hours, usually about 1 hour, at ambient temperature or above. Then the mixture is treated with an alkali such as sodium hydroxide, potassium hydroxide, calcium hydroxide, lithium hydroxide, sodium carbonate and the like, while being subjected to high intensity mixing. The intensity of the mixing is difficult to specify quantitatively because of several interrelated factors, including the type of mixing apparatus utilized. However, high intensity mixing as used herein is more intense than is normally encountered as a result of being pumped through ordinary liquid pumps and is of an intensity such that disruption of the corn flour is achieved permitting separation of high-quality starch from protein. The alkali is thoroughly and vigorously mixed with the corn flour—sulfite mixture in an amount of from about 1 to 3%, more preferably 1 to 2%, by weight of the flour. The temperature at which the alkali is mixed with the corn flour/sodium sulfite slurry can be in the range 40 to 130° F., and most preferably is 80° to 100° F. After thorough mixing, the aqueous slurry of the corn flour, sodium sulfite and alkali is then subjected to a centrifugal separation procedure whereby protein is separated from starch. The starch can be washed to yield a high purity white starch of low protein content.

There is an interrelationship between the particle size of the starch source material, the amount of alkali and sulfite used, the intensity of mixing and the efficiency of the procedure for separating the starch and protein. Thus, with the use of sulfite lesser amounts of alkali can be used. Likewise, the intensity of mixing or shearing action to be exerted on the starch slurry cannot be generally specified quantitatively since it depends on the particular mixing or shearing action of the apparatus used and the amounts of alkali and sulfite employed as well as the particle size of the starch material. The optimum amounts of alkali and sulfite to employ as well as the intensity of the mixing or shearing force to apply to the corn slurry can be readily and routinely determined by correlating these factors to obtain a starch product of desired quality, i.e., a starch product containing minimum amounts of protein. In general, amounts of sulfite and/or alkali and the intensity of mixing are correlated so as to accomplish separation of at least 75% of the protein from the starch and preferably so as to separate the maximum amount of protein.

Figure 2:
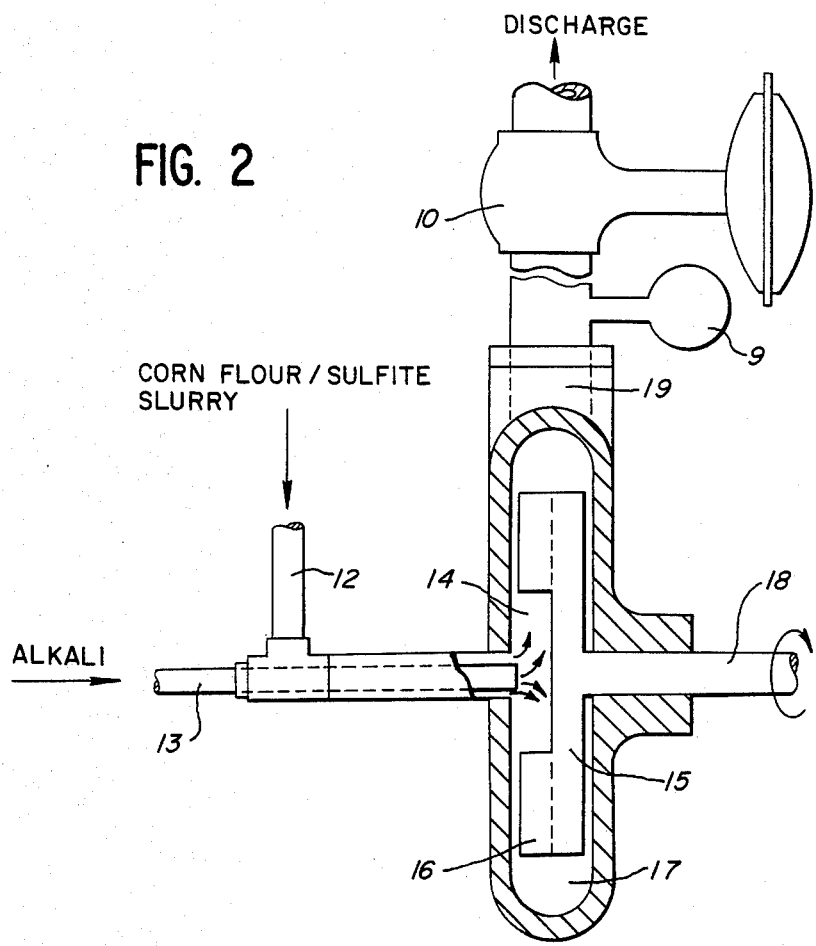

Referring to the drawings, FIG. 1 is a flow diagram illustrating a typical process according to this invention and FIG. 2 is a cross sectional illustration of the centrifugal pump.

Referring to FIG. 1 an aqueous slurry of corn flour and sodium sulfite is stirred in the slurry tank 1 with the aid of an agitator 2. A solution of an alkali is stored in storage tank 5. After stirring with sodium sulfite, the corn flour slurry and alkali solution are simultaneously pumped by means of positive displacement pumps 3 and 6, respectively, through a centrifugal pump 8. A pressure regulating valve 10, or sufficient head on the discharge side of the pump, is employed to maintain the operating pressure or back-pressure greater than the shut-off pressure as defined in the performance curve of the centrifugal pump. The result is a centrifugal pump unit which works as a high intensity mixing device but with no pumping capacity. Operating pressure is monitored by way of pressure gauges 4, 7 and 9. The resultant treated starch slurry is then subjected to centrifugation in separator 11 from which a high purity starch is recovered.

Various means are available for mixing with high intensity the sodium hydroxide with the aqueous slurry of corn flour and sodium sulfite. These include, for example, conventional high-speed centrifugal pumps with a suitable back-pressure arrangement as described above, dispersers (such as manufactured by Kinetic Dispersion Corporation), homogenizers (such as manufactured by Tekmar Co.), shear pumps (such as manufactured by Waukesha Foundry Co.), emulsifiers (such as manufactured by Nettco Corp.), sonic emulsifiers (such as manufactured by Sonic Corp.), colloid mills (such as manufactured by Gaulin Corp.), high speed wet mills (such as manufactured by Day Mixing), jets (such as manufactured by Penberthy Div., Houdaille Industries, Inc.), high intensity mixers (such as manufactured by J. W. Greer, Inc.) and the like. The mixing means employed in accumulating the data presented herein was a typical centrifugal pump with a pressure regulating valve as shown in the figure of the drawing. As shown in FIG. 2 of the drawing, the aqueous corn flour/sulfite slurry is supplied through an inlet pipe 12 at a known and controlled flow rate into the eye 14 (center) of the impeller 15. Alkali solution flows at a known and controlled flow rate through the pipe 13 also to the impeller eye 14. The impeller 15 is rotated by a motor driven shaft 18. The impeller 15 has radial vanes 16 integrally attached to it. The two liquids flow radially outward in the spaces between the vanes. By the action of the impeller vanes, mixing and backblending of the fluids are accomplished. The velocity of the fluid is increased when contacted by the impeller vanes 16 and the fluid is moved to the periphery where it is collected in the outer edges of the impeller reaction chamber 17. Reacted material then flows toward and out the discharge port 19.

The constant pressure regulating valve 10 maintains a pressure above the shut-off pressure for the centrifugal pump. It then becomes an in-line device directing the rotating shaft mechanical energy into the flow medium. The back pressure allows the impeller reaction chamber and space between the vanes to always remain full to avoid cavitation. The material flow rate is determined only by the input fluid flow rate to the pump. The above system was operated at a flow rate of 0.5 gallon per minute but higher rates can be used. Flow rates will vary depending on the type and size of the mixing device.

The present invention and the advantages thereof are further illustrated by the following examples.

EXAMPLE I

Aqueous 25% dry solids corn flour slurries containing 0.4% or 0.6% sodium sulfite by weight on dry solids basis were stirred for one hour. The slurries then were pumped to the eye of a centrifugal pump as generally shown in the drawing. The centrifugal pump used was a Worthington Model 3/8 CNG-4 with a standard full size impeller. The impeller was a 3⅜ inch diameter open impeller with two straight vanes of approximately 7/16 inch width. The vanes extended for a distance of 1⅜ inch inward from the outer tip and were pitched backwards from the rotation at an angle of approximately 47° from the point of intersection of a radius and the inner edge of the vane.

Simultaneously, a solution (10%) of sodium hydroxide was pumped into the centrifugal pump. The amount of sodium hydroxide used was controlled by flow rate to provide titratable alkalinities as shown below. (Titratable alkalinity—% sodium hydroxide on dry solids basis.)

Back pressure was maintained on the system at approximately 75 psig by means of a pressure regulating valve. The centrifugal pump was operated at a constant speed of 3600 revolutions per minute. Pump volume was such that the average residence time was approximately 2.6 seconds in the mixing chamber.

The corn cones originally contained 8.0% protein and had an average particle size of about 0.007 inch and the corn flour contained 6.4% protein with an average particle size of about 0.006 inch.

Starch samples were recovered for analysis by centrifuging about 250 milliliters of the mixed slurry leaving the centrifugal pump in an International centrifuge, discarding the supernatant, removing the top, protein layer, resuspending the starch layer in tap water to a volume of about 250 milliliters and recentrifuging. The results were as follows:

| Starch Source | Sodium Sulfite, % | Titratable Alkalinity, % | Protein, % dsb* |
|---|---|---|---|
| Corn flour | 0.4 | 1.00 | 1.22 |
| Corn flour | 0.4 | 1.53 | 0.77 |
| Corn flour | 0.4 | 2.14 | 0.83 |
| Corn flour | 0.4 | 2.67 | 0.72 |
| Corn flour | 0.6 | 1.38 | 0.88 |
| Corn flour | 0.6 | 1.79 | 0.76 |
| Corn flour | 0.6 | 2.15 | 0.47 |
| Corn flour | 0.6 | 2.64 | 0.49 |
| Corn cones | 0.4 | 1.65 | 0.75 |
| Corn cones | 0.4 | 1.66 | 0.65 |
| Corn cones | 0.4 | 2.52 | 1.44 |
| Corn cones | 0.4 | 2.85 | 1.64 |
| Corn cones | 0.6 | 1.99 | 0.83 |
| Corn cones | 0.6 | 2.28 | 1.37 |
| Corn cones | 0.6 | 2.58 | 1.43 |
| Corn cones | 0.6 | 2.67 | 1.63 |

*dsb - dry solids basis

EXAMPLE II

Following the general procedures of Example I, the corn flour and sodium sulfite were stirred for various periods of time before being subjected to a shearing force in the centrifugal pump. Sodium sulfite concentration and titratable alkalinity values were varied as shown below.

| Run No. | Mixing Time, Min. | Sodium Sulfite, % | Titratable Alkalinity, % | Protein, % dsb |
|---|---|---|---|---|
| 1 | 60 | 0 | 1.42 | Not Tested |
| 2 | 16 | 0.4 | 1.48 | Not Tested |
| 3 | 30 | 0.4 | 1.37 | 0.68 |
| 4 | 45 | 0.4 | 1.45 | 0.67 |
| 5 | 60 | 0 | 1.42 | Not Tested |
| 6 | 16 | 0.4 | 1.70 | Not Tested |
| 7 | 30 | 0.4 | 1.81 | 0.55 |
| 8 | 45 | 0.4 | 1.92 | 0.60 |
| 9 | | | | |
| 10 | 16 | 0.4 | 2.36 | 0.62 |
| 11 | 30 | 0.4 | 1.58 | 0.53 |
| 12 | 45 | 0.4 | 2.24 | 0.58 |
| 13 | 15 | 0 | 1.39 | 0.61 |
| 14 | 15 | 0.4 | 1.41 | 0.42 |

-continued

| Run No. | Mixing Time, Min. | Sodium Sulfite, % | Titratable Alkalinity, % | Protein, % dsb |
|---|---|---|---|---|
| 15 | 45 | 0.4 | 1.20 | 0.50 |
| 16 | 15 | 0.8 | 1.27 | Not Tested |
| 17 | 15 | 0 | 1.78 | 0.51 |
| 18 | 15 | 0.4 | 1.73 | 0.42 |
| 19 | 45 | 0.4 | 1.45 | 0.46 |
| 20 | 15 | 0.8 | 1.53 | 0.46 |
| 21 | 15 | 0 | 2.25 | 0.48 |
| 22 | 15 | 0.4 | 2.20 | 0.38 |
| 23 | 45 | 0.4 | 1.91 | 0.40 |
| 24 | 15 | 0.8 | 1.82 | 0.44 |

EXAMPLE III

An aqueous slurry, 25% dry solids starch corn flour containing 6.4% protein and 0.4% sodium sulfite, was mixed for one hour and then mixed with sodium hydroxide in a centrifugal pump as described in Example I. The titratable alkalinity of the treated starch was 1.02. The treated starch from the centrifugal pump mixer was recovered in a Merco C-9 disc type centrifuge followed by washing in a hydroclone and finally separating in a Wesphalia Model No. LWA205 laboratory chamber bowl type centrifuge. The treated starch produced was pooled and recovered as described above. The protein of the Merco C-9 unders was 0.36% and successive passes through the hydroclone gave 0.23%, 0.20% and 0.22%, respectively, all values based on 10% moisture starch.

EXAMPLE IV

Waxy corn was processed in laboratory apparatus using typical dry milling procedures. The product was separated into three fractions representing (1) hulls, (2) germ, and (3) grits. The size of the product included in the grits portion was 1.68 millimeter and smaller.

An aqueous 20% dry solids slurry was prepared with waxy corn grits or flour. To that slurry was added 0.2% dry sodium bisulfite based on dry solids flour. The slurry containing sodium bisulfite was agitated for 20 minutes, then pumped through the centrifugal pump as described in Example I.

Sodium hydroxide (10% solution) was added simultaneously as described in Example I to a level yielding a titratable alkalinity of 2.24% on dry solids flour.

The resultant slurry was separated using a laboratory centrifuge (International model 05675 M-1) at 2,000 revolutions per minute. The starch fraction was dried and assayed for residual protein content.

The protein content of the starting flour, 12.2% dry solids basis, was reduced to 0.99% on dry solids basis (0.89% on commercial starch). The results indicate that the process is applicable to the waxy maize variety of corn.

EXAMPLE V

As described in Example IV, a similar run was conducted on a high amylose variety of corn.

A slurry of the high amylose flour was prepared at 20% dry solids basis. Dry sodium bisulfite was added at 0.2% on dry solids flour. Sodium hydroxide (10% solution) was added to a titratable alkalinity of 3.18% on dry solids flour.

Protein content of the starting flour, 8.85% dry solids basis, was reduced to 1.07% on dry solids basis (0.96% on commercial starch). The results indicate that the process is applicable to the high amylose variety of corn.

EXAMPLE VI

Aqueous 25% dry solids corn flour slurries containing 0, 0.2 or 0.4 percent sodium sulfite as indicated below were prepared and stirred for 0 or 60 minutes. The slurries then were treated by the procedure described in Example I using caustic to give the titratable alkalinity levels shown below.

Samples were recovered for protein assay as described in Example I. The corn flour originally contained 8.49% protein on a dry basis or 7.64% on a commercial basis.

| Sample | Titratable Alkalinity, % | Sodium Sulfite % | Hold Time | Protein, % On dsb* | Commercial Weight Basis** |
|---|---|---|---|---|---|
| 1 | 1.14 | 0.0 | None | 2.10 | 1.89 |
| 2 | 1.62 | 0.0 | None | 1.47 | 1.32 |
| 3 | 1.94 | 0.0 | None | 1.17 | 1.05 |
| 4 | 1.51 | 0.2 | 60 min. | 1.06 | 0.95 |
| 5 | 1.54 | 0.2 | None | 1.22 | 1.10 |
| 6 | 2.00 | 0.2 | None | 1.17 | 1.06 |
| 7 | 1.62 | 0.4 | 60 min. | 1.01 | 0.91 |
| 8 | 1.53 | 0.4 | None | 1.06 | 0.95 |
| 9 | 2.03 | 0.4 | None | 1.23 | 1.11 |

*dsb = dry solids basis
**Commercial Weight Basis = Starch containing approximately 10% water.

Summarizing the above data with the samples that were not mixed and held with the sulfite before the caustic treatment, the results are:

| | Titratable Alkalinity | | |
|---|---|---|---|
| | 1.14 | 1.53–1.62 | 1.94–2.03 |
| $Na_2SO_3$ | % Protein, 10% Moisture Basis | | |
| 0 | 1.89 | 1.32 | 1.05 |
| 0.2 | | 1.10 | 1.06 |
| 0.4 | | 0.95 | 1.11 |

As can be seen, higher quality starch is obtained with less titratable alkalinity when sodium sulfite is utilized.

EXAMPLE VII

The following results were obtained using an aqueous slurry of 25% dry solids corn flour containing 7.63% protein, 1.5% sodium hydroxide based on starch dry solids and 0.2% sodium sulfite on starch dry solids. Portions of the slurry and reagents were placed in a Waring Blender and run at various speed settings and times as indicated. Samples then were centrifuged in an International lab centrifuge, washed twice and the starch portion analyzed for protein. With low shear rates, settings 1, 3 and 5 for 5 seconds, starch purity was less and it was more difficult to separate the starch and protein layers. With more shear force, separation and recovery of higher purity starch was achieved.

| Sample No. | Waring Blender Speed | Time, seconds | Protein, Commercial Weight Basis % |
|---|---|---|---|
| 1 | 1 | 5 | 0.77 |
| 2 | 3 | 5 | 1.24 |
| 3 | 5 | 5 | 0.74 |
| 4 | 7 | 5 | 0.50 |
| 5 | 7 | 10 | 0.51 |
| 6 | 7 | 20 | 0.41 |
| 7 | 7 | 40 | 0.36 |

| Sample No. | Waring Blender Speed | Time, seconds | Protein, Commercial Weight Basis % |
|---|---|---|---|
| 8 | 7 | 80 | 0.39 |

Since the process can be operated on a continuous basis, capital requirements are reduced compared with those required for wet milling, but starch comparable in quality to wet milled starch is obtained. In addition, the process operates at ambient temperatures so no heat is required to accomplish protein separation as is required in the conventional wet milling process.

Those modifications and equivalents which fall within the spirit of the invention are to be considered a part thereof.

What is claimed is:

1. A process for producing granular starch which consists essentially of mixing for a period of not more than 4 hours at ambient temperature dehulled and degermed corn containing starch and protein with water to form an aqueous slurry, treating said aqueous slurry with alkali, subjecting the alkali containing slurry to high intensity mixing and then recovering granular starch from which at least 75% of the original protein content has been separated.

2. A process in accordance with claim 1 wherein sodium sulfite is present in the alkali containing slurry.

3. A process in accordance with claim 1 wherein the recovery of granular starch is accomplished by centrifugation.

* * * * *